March 15, 1949.        H. ALFVEN ET AL        2,464,428
VOLTMETER FOR HIGH VOLTAGES
Filed Nov. 29, 1944
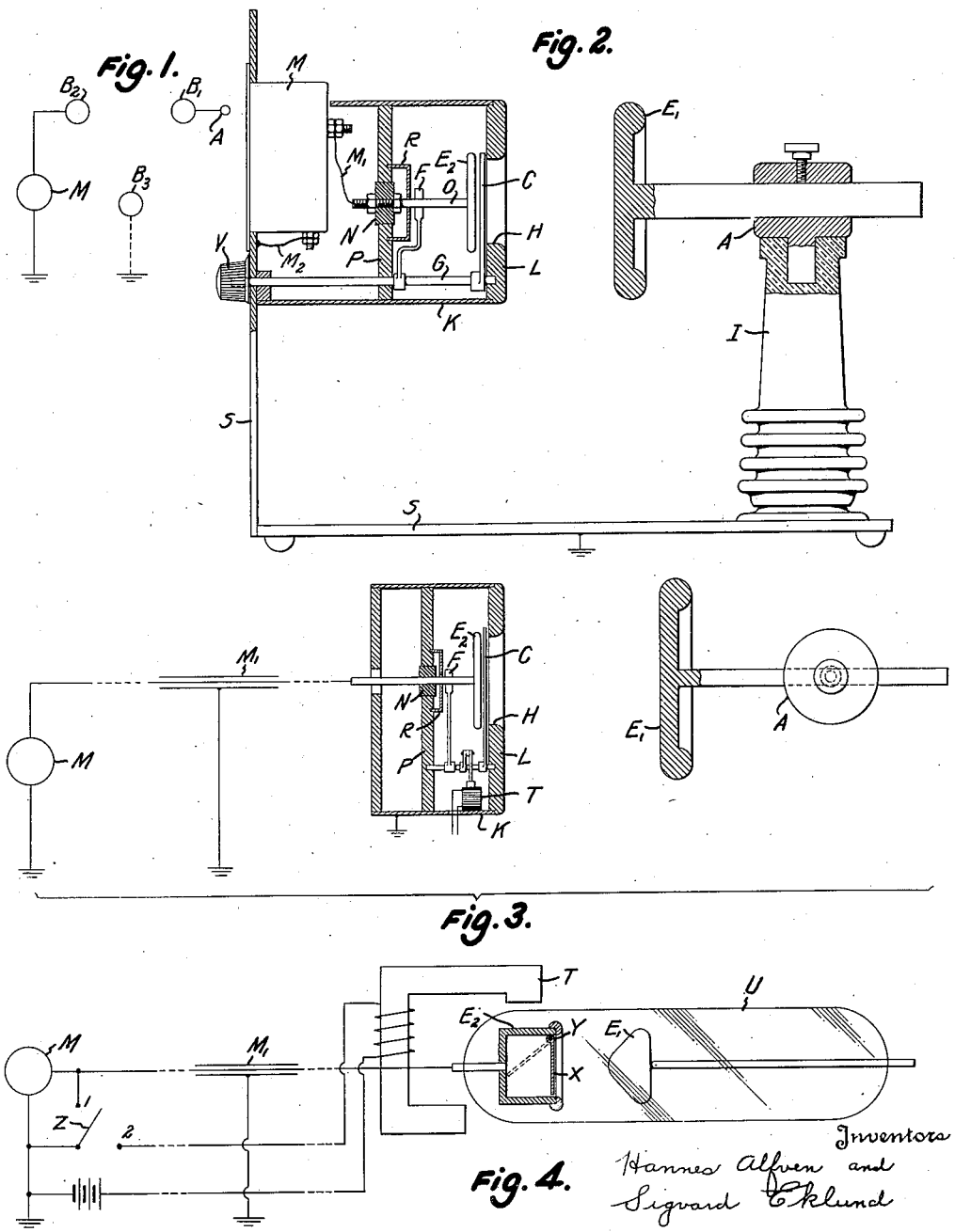
Inventors
Hannes Alfven and
Sigvard Eklund
By Pierre Scheffler & Parker
Attorneys Patented Mar. 15, 1949

2,464,428

UNITED STATES PATENT OFFICE 2,464,428

VOLTMETER FOR HIGH VOLTAGES

Hannes Alfvén and Sigvard Eklund, Stockholm, Sweden, assignors to LKB-Produkter Fabriks A.-B., Stockholm, Sweden, a corporation of Sweden Application November 29, 1944, Serial No. 565,720
In Sweden November 3, 1943

4 Claims. (Cl. 171—95)

Known types of voltmeters for high voltages (>10 kilovolts) have several disadvantages. For example, the use of ammeters in connection with great resistances upon measuring high voltages results in an undesirable current load and, furthermore, such measuring resistances do not, as a rule, maintain their resistance coefficient for a prolonged time. Instruments based on electrostatic attraction between two conductors are often impaired by errors due to friction and must be equipped with different scales for various measuring ranges.

The present invention provides an arrangement for measuring high voltages which consists of a system of conductors which by mechanical motion convert a high voltage into a low voltage which is measured by an electrostatic measuring instrument, and is substantially characterized by the fact that it is provided with a device which grounds the measuring instrument in a certain position of the conductors.

The invention will be more fully described in the following with reference to the accompanying drawing.

In the drawing, Figure 1 illustrates the principle of the invention, Figure 2 shows a voltmeter constructed according to this principle, Figure 3 shows an embodiment of the device when the measuring instrument has to be placed at a great distance from the conductor system, and Figure 4 shows an embodiment according to which the conductor the high voltage of which is to be measured is entirely enclosed within an evacuated container.

The voltage to be measured is connected at A to one or more of a system of conductors $B_1$, $B_2$, $B_3$. One or more of these conductors (according to Figure 1 the one designated by $B_2$) communicates with one terminal of an electrostatic measuring instrument M for low voltages, the other terminal of the instrument being permanently grounded. By mechanically changing the position of one or more of the conductors a voltage is induced which is measured by the measuring instrument M and which is a measure of the voltage of the conductor A.

An embodiment of a voltmeter according to this principle is illustrated in Figure 2. Mounted on a grounded frame S are an electrode $E_1$, which is connected to the high voltage to be measured, and an electrode $E_2$ which is connected via conductive supporting axle O and lead $M_1$ to one terminal of an electrostatic voltage measuring instrument M for low voltages the other terminal of the instrument being permanently grounded to frame S through lead $M_2$. In the embodiments shown, the distance between the electrodes $E_1$ and $E_2$ may be varied by displacing the electrode $E_1$ in the connection or holder A secured to an insulator I. The electrode $E_2$ and, to some extent, the measuring instrument M are surrounded by a protective casing K provided with a cover L. In the cover there is arranged a circular aperture H. Mounted on the inside of the cover is a diaphragm C which in its closed state entirely screens the electrode $E_2$ from the electric field emitted from the electrode $E_1$. At the same time as the diaphragm is closed, the electrode $E_2$ and hence that terminal of instrument M to which it is connected are grounded through the intermediary of a spring F which is mounted on an axle G electrically connected with grounded frame S at its journals, and by means of which the diaphragm C is operated. The axle G is connected to a rotary device V at the front side of the front plate. Devices not shown in the drawing permit an entirely open or entirely closed position of the diaphragm C. Axle O which carries electrode $E_2$ is mounted in an amber insulator N that is fixed in a disc P within the casing K. The amber insulator N is protected from dust by means of a casing R. The measuring by means of this voltmeter M is effected when the diaphragm is opened. As a result the instrument M makes a deflection which because of the high insulation is practically constant for a period which is many times longer than required for a reading. When the reading has been taken, the diaphragm C is returned to its shielding position between electrodes $E_1$ and $E_2$ and simultaneously grounds the instrument terminal as spring F reengages the axle O. Both terminals of the electrostatic voltmeter instrument M will then be grounded. The measuring range may be altered by displacing the electrode $E_1$.

The embodiment shown in Figure 3 is used in cases where it is desired to place the measuring instrument at a relatively great distance from the conductor system, which is the case in connection with X-ray apparatus, for example. In these cases, the measuring instrument may be connected to the conductor system by means of a well insulated cable and the diaphragm may be operated mechanically or electromagnetically. In Figure 3 the high-voltage electrode slidable in its holder A is, as in Figure 2, designated by $E_1$ and the stationary low-voltage electrode by $E_2$. The electrode $E_2$ communicates by means of a well insulated cable $M_1$ with the electrostatic voltage measuring instrument M. The electrode $E_2$ is enclosed within a grounded, cylindrical casing K which at the front is provided with a cover L in which there is provided a circular aperture H. The electrode $E_2$ may be screened from the field emanating from the electrode $E_1$ by means of a diaphragm C mounted on the inside of the cover L, said diaphragm being operated by means of an electromagnetic device T which simultaneously controls the grounding device F by means of which the electrode $E_2$ is grounded every time the diaphragm C is closed. The electrode $E_2$ is fixed in an amber insulator N which is mounted in a disc P inserted in the casing K. A casing R protects the insulator N from dust.

The high-voltage conductor the voltage of which is to be measured, may be entirely enclosed within a container which is filled with oil, gas of high pressure or is highly evacuated, also the conductor system may be enclosed within the same container or within a separate container which is also filled with oil, gas of high pressure or is highly evacuated. Such an embodiment of the invention is shown in Figure 4, in which the container U under consideration is highly evacuated. As before, $E_1$ designates the electrode on the high-voltage side and $E_2$ a low-voltage electrode which communicates with the measuring instrument M by means of a well insulated cable $M_1$. In the electrode $E_2$ a movable shield or damper X, preferably of ferromagnetic material, is so arranged that the capacitance between the electrodes $E_1$ and $E_2$ varies according to whether the shield X occupies the position which is indicated by means of the full or the dashed line in Figure 4. The movement of the shield X around its pivot axis Y is effected by the aid of a magnetic field which is provided by means of the electromagnet T. A switch Z grounds the measuring instrument in the position designated by 1. On passing to the position designated by 2 the ground connection is interrupted, electromagnet T is energized and the shield X rises to the dashed line position. Normally, the switch Z is in the position 1. Upon measuring, it is adjusted into the position 2, in which event the measuring instrument makes deflection which is a measure of the voltage impressed upon the electrode $E_1$. When the voltage reading on instrument M has been taken, the switch is restored to position 1.

What we claim and desire to secure by Letters Patent is:

1. Apparatus for measuring the voltage between a high voltage conductor and a lower voltage conductor comprising, in combination, a high voltage electrode adapted to be connected to said high voltage conductor, a measuring electrode mounted in spaced relation with respect to said high voltage electrode, an electrostatic voltmeter, connections between one terminal of said voltmeter and said lower voltage conductor, connections between the other terminal of said voltmeter and said measuring electrode, a screen for shielding said measuring electrode from the field produced by said high voltage electrode, means for moving said screen into and out of shielding position, said screen being maintained in its non-shielding position during the period required for reading said voltmeter and then returned to said shielding position and contact means cooperative with said screen moving means for connecting said other voltmeter terminal to a point having the potential of said lower voltage conductor only when said screen occupies its shielding position.

2. The invention as set forth in claim 1, wherein electromagnetic means is provided for moving the shield from one position to the other.

3. Apparatus for measuring high voltages comprising a grounded frame, an insulator mounted on said frame, an electrode mounted on said insulator for connection to the voltage to be measured, a housing mounted on said frame, said housing including an aperture in one wall thereof facing said high voltage electrode, a measuring electrode mounted within said housing and facing said aperture, an electrostatic voltmeter having one terminal thereof connected to said measuring electrode and the other terminal to ground, a movable screen cooperative with said aperture for closing and opening the same, said aperture being maintained continuously open during the period required for reading said voltmeter and then closed, means for moving said screen, and contact means cooperative with said screen moving means for grounding the said voltmeter terminal connected with said measuring electrode when said aperture is closed.

4. Apparatus for measuring high voltages comprising a closed container, an electrode mounted within said container for connection to the voltage to be measured, a cupped measuring electrode mounted in said container in spaced relation to said high voltage electrode, the mouth of said measuring electrode facing said high voltage electrode and being provided with a hinged shield of magnetic material which normally closes the mouth, an electromagnet located exteriorly of said container and the poles of which occupy such position that when said magnet is energized, said shield member is turned on its hinge by magnetic attraction to open the mouth of said measuring electrode, an electrostatic voltmeter one terminal of which is connected to said measuring electrode and the other to ground, a ground connection for that terminal of said voltmeter connected to said measuring electrode, a source of energizing current for said electromagnet, and switch means operative alternatively to simultaneously connect said electromagnet to said energizing source and remove said ground connection, or disconnect said electromagnet from said energizing source and replace said ground connection.

HANNES ALFVÉN.
SIGVARD EKLUND.

REFERENCES CITED

The following references are of record in the file of this patent:

UNITED STATES PATENTS

| Number | Name | Date |
|---|---|---|
| 516,341 | Ayrton et al. | Mar. 13, 1894 |
| 1,809,285 | Peters | June 9, 1931 |

FOREIGN PATENTS

| Number | Country | Date |
|---|---|---|
| 282,094 | Great Britain | Aug. 2, 1928 |
| 168,775 | Switzerland | Aug. 1, 1934 |